United States Patent [19]

König et al.

[11] 3,769,581
[45] Oct. 30, 1973

[54] APPARATUS FOR MEASURING THE DRY UNIT WEIGHT OF A SOIL

[76] Inventors: Fritz König, Wuppertal; Klaus König, Unterbach, both of Germany

[22] Filed: Oct. 14, 1971

[21] Appl. No.: 189,325

Related U.S. Application Data

[63] Continuation of Ser. No. 780,966, Dec. 4, 1968, abandoned.

[52] U.S. Cl. .................. 324/65 R, 73/32, 73/73, 235/151.33
[51] Int. Cl. ............................................. G01r 27/02
[58] Field of Search ............... 324/65 R, 30; 73/32, 73/73; 235/151.3, 151.33

[56] References Cited
UNITED STATES PATENTS

| | | | |
|---|---|---|---|
| 2,793,527 | 5/1957 | Turner, Jr. et al. | 73/73 |
| 2,869,359 | 1/1959 | Offermann | 73/73 |
| 2,903,884 | 9/1959 | Kirtz | 73/32 |

FOREIGN PATENTS OR APPLICATIONS

| | | | |
|---|---|---|---|
| 1,520,976 | 3/1968 | France | 73/32 |
| 184,508 | 12/1966 | U.S.S.R. | 324/61 |

Primary Examiner—Stanley T. Krawczewicz
Attorney—E. C. Vandenburgh

[57] ABSTRACT

Apparatus for measuring the dry unit weight of a soil, either directly or with reference to a known soil variable (e.g., the Proctor density) by means of a measuring probe containing two electrodes in the soil under investigation. The measuring probe is energized with a constant a.c., voltage, and is connected in series to a measuring resistance at which a voltage drop occurs proportional to probe current (I). The voltage tapped at measuring resistance overlaps a continuously adjustable part of the said constant a.c. voltage, and, in a phase-sensitive rectifying indicating device, a proportion, continuously adjustable from zero, of the sum voltage obtained by the superposition is superposed on a second component, continuously adjustable from zero, of the constant a.c. voltage.

9 Claims, 1 Drawing Figure

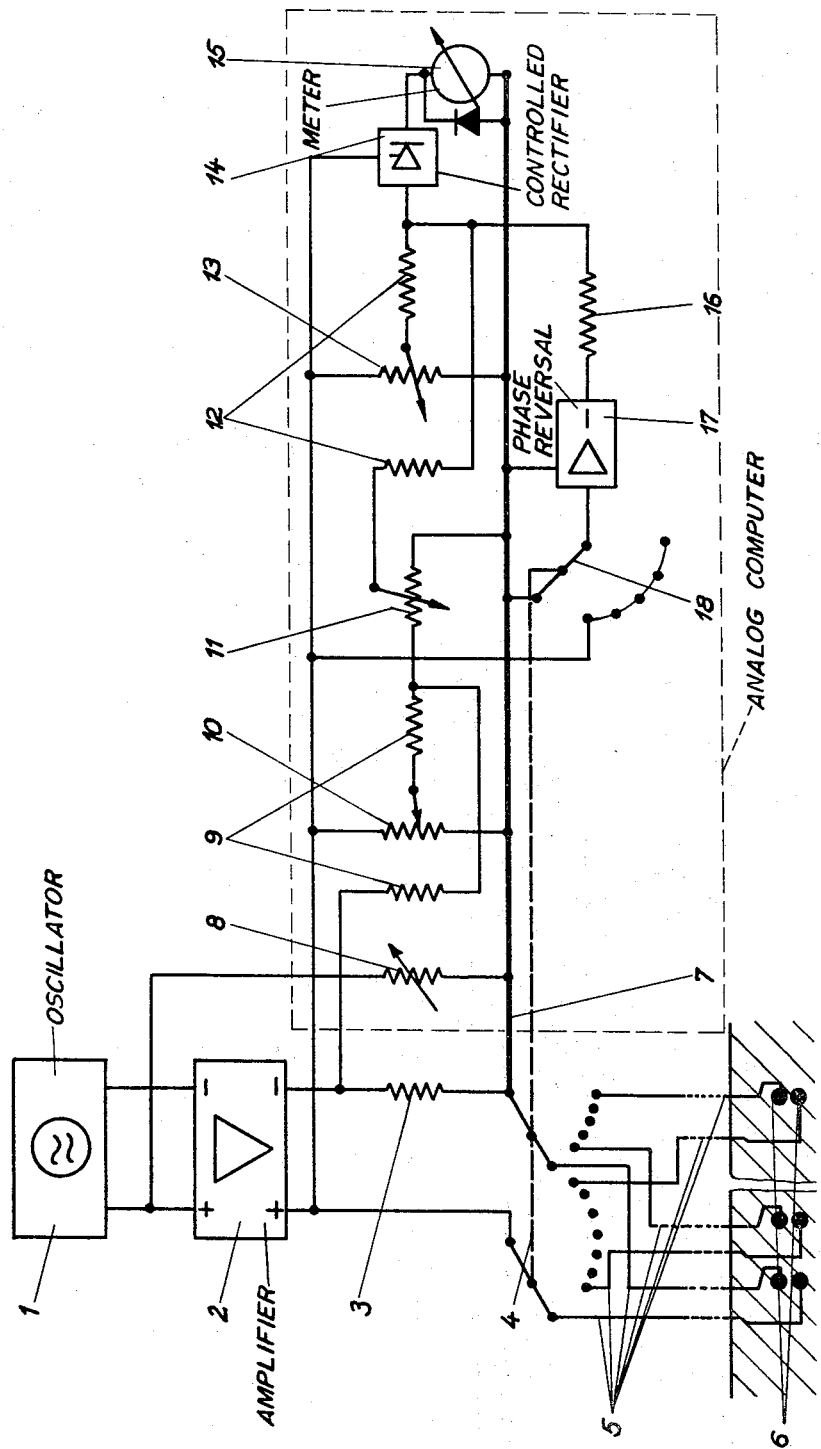

APPARATUS FOR MEASURING THE DRY UNIT WEIGHT OF A SOIL

This is a continuation, of application Ser. No. 780,966, filed Dec. 4, 1968 now abandoned.

The invention relates to a method of and apparatus for measuring the dry unit weight of a soil, either directly (e.g., in pounds per cubic foot) or with reference to a known soil variable (e.g., the Proctor density), by means of a measuring probe containing two electrodes in the soil under investigation.

Soil used for the construction of road sub-bases and for filling embankments needs to have adequate compaction. As a rule, the conditions of contracts laid down by the building authorities give minimum values which must be reached when building work is carried out. Various methods are known for measuring the compaction of the fill from the compaction of the soil. In conventional methods, samples of undisturbed soil are taken out and their dry weight and volume are determined. These methods, however, are laborious and time-consuming, and so are not highly thought of in practice. Furthermore, it is very difficult to determine the dry unit weight at a depth of e.g., 50 to 80 cm under the surface of the fill. As a result, the measurements are seldom made with the necessary care and accuracy.

Other methods make use of the absorption of radioactive rays by the solid and liquid components of the soil. In order to distinguish between the two kinds of absorption, observations of the absorption of different kinds of radiation (neutron and gamma radiation) have to be made simultaneously, with a resultant increase in the cost of equipment, in addition to the general difficulties of using radioactive materials. It is also difficult to derive the required results from the measured counting rates.

In other methods, instead of determining the soil density, the elasticity modulus is determined by static methods (the load slab test) or by dynamic methods (the speed of propagation of three-dimensional or two-dimensional waves). In practice, however, slab pressure tests are restricted to regions near the surface, and the evaluation of measurements of wave propagation are excessively complicated and are sometimes insufficiently accurate. The method has the further disadvantage that the quantity which is determined is much more dependent on the interlocking of the soil than on its compaction. According, for example, to J. Theiner, Dissertation TH Aachen 1957, the elasticity modulus may be increased by up to 100 percent if the upper layer of gravel is made more compact by means of heavy, smooth rollers; this treatment, however, has hardly any effect on the dry unit weight. A difference of even a few per cent, however, in the dry unit weight is an important consideration in the conditions of contracts. The last-mentioned method, therefore cannot be expected to give results which can be used to decide whether to give or not to give a contract.

It is also known to use electric resistance measurements for the determination of soil density (G. Kronenberger in "Forschungsberichte des Landes Nordrhein-Westfalen," No. 977). In the known method, a direct current is used. The soil resistance is measured with a Wheatstone bridge. The method, therefore, does not directly indicate the dry unit weight; instead, the bridge has to be balanced. Various difficulties occur as a result.

Measurements of soil resistance cannot be used to determine the dry unit weight of the soil. The method is suitable for showing the rate of increase in compaction, depending on the depth and the number of passes, but cannot give a quantitative measurement.

The fact that the bridge has to be balanced causes a further difficulty in practice. Owing to the effect of polarization on the electrodes, the measurements have to be made in not more than 2 seconds. An operator who can balance a bridge in this time requires considerable dexterity.

The measurements are compared by referring them to the results for freshly filled soil. It is found, however, that the filling densities are very non-uniform and cannot be reproduced. Since the results are compared with such unreliable reference quantities, it is impossible to compare the amount of compaction at different places or after different treatment. For these reasons, the known method of measuring soil density from the electrical resistance is little used in practice.

Another object of the invention is to provide apparatus for measuring the dry unit weight of a soil, either directly or with reference to a known soil variable (e.g., the Proctor density). The operator is thus saved the trouble of separately determining data such as the volume, weight and water content and using them to calculate the reference dry unit weight.

A further object of the invention is to provide apparatus having sufficient accuracy.

A still further object of the invention is to provide apparatus which can be used for measurements in any depth of soil and in the widest possible variety of soils occurring in practice.

Another object of the invention is to provide apparatus which can make the measurements in a short time.

A further object of the invention is to provide apparatus of the afore-mentioned type which can make measurements while the soil is being used for building work and which, in particular, has a mechanism which is insensitive to the building operations.

The apparatus according to the invention is characterized in that the measuring probe is connected to a source of alternating current and that the electric circuit containing the measured distance is connected to an analog computer network which can be adjusted by test measurements with known soil samples and can generate an analog output signal corresponding to the reference dry unit weight.

The invention is based on the empirical fact that a current across the measured distance can be linearly represented as the product of the soil water content and the reference dry unit weight. The coefficients can be determined by measurements on two samples of the soil under investigation, having known dry unit weights.

According to the invention, the relation between the reference dry unit weight and the electrical quantities can be adjusted by test measurements on an analog computer network so as to give an analog output signal related to the reference dry unit weight. It is important to note that the water content of the soil is practically unchanged by the compaction process.

The construction of the analog computer is closely dependent on the electrical measuring variables used at the start. In principle, it is a routine matter for the skilled operator to construct the aforementioned analog computer circuits when he knows what computing operations have to be performed. It has been found particularly advantageous to use probe current I as the electrical measuring quantity. It has been found that the reciprocal reference dry unit weight is a linear function of the probe current, according to the following equation:

$$Y_{t_2}/Y_t = 1 - (1 - 1/g) I - I_2/I_1 - I_2$$

In the equation:

$\gamma t$ = dry unit weight of the soil being measured, $\gamma t_{1,2}$ = dry unit weights of two known soil samples 1 and 2, $g = \gamma\, t_1/\gamma\, t_2$, $I$ = current of measuring probe in the soil specimen under investigation, and $I_{1,2}$ = current from soil samples 1 and 2.

Advantageously, the apparatus is constructed so that the measuring probe is energized with a constant a.c. voltage, that the probe is connected in series to a measuring resistance at which a voltage drop occurs proportional to the probe current, that the voltage tapped at the measuring resistance is superposed on a voltage which voltage is a continuously adjustable fraction of the said constant a.c. voltage, and that, in a phase-sensitive rectifying indicating device, a proportion, continuously adjustable from zero, of the sum voltage obtained by said superposition is superposed on a second voltage which also is a fraction, continuously adjustable from zero, of the constant a.c. voltage.

The aforementioned analog computer can simulate the aforementioned relationship, thus directly showing the reference dry unit weight or its reciprocal. Advantageously, tha apparatus is used as follows: a first and a second soil specimen of known dry unit weight are prepared from the soil under investigation, the second voltage fraction of the constant a.c., voltage in the second soil specimen is adjusted to zero by means of a measuring probe and the first component is adjusted so that the indicator indicates zero, the component of the sum voltage in the first soil specimen is then adjusted to zero by means of a measuring probe and the second voltage fraction of the constant a.c., voltage is adjusted so that the reading corresponds to the dry unit weight of the second soil specimen, and the component of the sum voltage is varied until the reading corresponds to the dry weight of the first soil specimen.

An embodiment of the invention will now be described by way of example with reference to the accompanying drawing.

A low-frequency oscillator 1 has an oscillating frequency of e.g. 200 Hz. Its output voltage goes to an amplifier 2, which has a very low output resistance, but is proof against short-circuits. The amplifier output voltage goes through a measuring resistance 3 to two tongues of a step-by-step switch 4 having at least two switching arrays. Measuring probe 6 has three pairs of spaced electrodes which can be connected via cables 5 and via the two switching arrays of switch 4 to the output circuit of amplifier 2, in series with measuring resistance 3. A coupling resistance 8 connects a line 7, which from now on will be considered to be at the reference voltage, to the input of amplifier 2. The voltage tapped at measuring resistance 3 is added across adding resistances 9 to a component of the output voltage of amplifier 2. This voltage component is tapped at an adjustable potentiometer 10. A component of the resulting sum voltage is tapped at a voltage divider 11. The sum voltage component tapped at potentiometer 11 is added by additional adding resistance 12 to a second component of the output voltage of amplifier 2, which is tapped at a potentiometer 13. The resulting sum voltage goes to a rectifier 14 which is controlled by the output voltage of amplifier 2. The resulting voltage, which is phase-sensitive and rectified, is indicated by an instrument 15 such as a meter.

The output voltage of a phase reversal stage 17 is also added to the input of controlled rectifier 14 across an adding resistance 16. The input of phase reversal stage 17 is connected across a third tongue 18 in the third switching array of switch 4 to the reference potential of line 7 (when switch 4 is in the first position), and to the reference voltage of amplifier 2, when switch 4 is in all other positions.

The apparatus described operates as follows:

As already stated, the dry unit weight of the specimen under investigation and the probe current are connected by the expression:

$$Y_{t_2}/Y_t = 1 - (1 - 1/g) I - I_2/I_1 - I_2$$

A constant voltage at the electrodes of probe 6 is produced by oscillator 1 and amplifier 2. The resulting probe current I produces a proportional voltage drop at measuring resistance 3. The circuit is adjusted as follows:

When step-by-step switch 4 is in its first position, the output voltage of amplifier 2 travels through measuring resistance 3 and a first connecting cable 5 to the probe 6 in the soil second specimen. When switch 4 is in the first position, the slide on potentiometer 11 is moved to the adding point, i.e., the entire sum voltage is tapped. Voltage divider 13 and its slide are connected to the reference potential of line 7, with the result that no voltage is tapped from voltage divider 13. Under these conditions, voltage divider 10 is adjusted until instrument 15 does not show any direct current. In this way, upon adjustment of voltage divider 10 the value of $I_2$ will become stored within the analog circuitry. Switch 4 is then switched into its second position, at which the outputs of amplifier 2 are connected via measuring resistance 3 to the probe in the first soil specimen. When switch 4 is in its second position, the tap of potentiometer 11 is first connected to the reference potential of line 7, with the result that none of the sum voltage is tapped. Instrument 15 is then adjusted by means of potentiometer 13 until it shows the dry unit weight of the second specimen, referred to the Proctor density. This dry unit weight is already known. After potentiometer 13 has been adjusted in this manner, i.e., after $\gamma t_2$ has been stored potentiometer 11 is adjusted so that its reading corresponds to the dry unit weight of the soil specimen 1, referred to the Proctor density i.e., on adjustment of the potentiometer 11 the factor:

$$\frac{1-\frac{1}{g}}{I_1 - I_2} \quad \text{which is the same as} \quad \frac{1-\frac{Y_{t_2}}{Y_{t_1}}}{I_1 - I_2}$$

will be stored. The analog computer is now completely adjusted. In this adjustment procedure only the values of $I_2$ and $Y_{t_2}$ will be stored as such, whereas the other quantities will be stored in the form of certain mathematical combinations according to the terms of the equation. When switch 4 is in its other position, it acts as a check switch for additional specimen 6, when they are connected.

It can be seen that, when the computer is adjusted in the aforementioned manner, it simulates the cited relationship between the dry unit weight of the specimen 5 under investigation, referred to the Proctor density, and the probe current. The resulting voltage at measuring resistance 3 corresponds to the current I flowing through the measuring probe, which is connected at the aforesaid constant voltage. At the adding point in front of the potentiometer 11, the current corresponding to the second soil specimen is subtracted. Potentiometer 10 has been adjusted so that the sum voltage is zero in the second soil specimen. The signal therefore corresponds to $I - I_2$. The adjustment of potentiometer 11 takes account of the factor associated with $I - I_2$ in the term to the right in the cited equation. The voltage tapped on potentiometer 13, which is added, represents the minus term on the right hand side of the equation.

The voltage added via adding resistance 16 from phase reversal stage 17 to the input of controlled rectifier 14 separates the electrical from the mechanical zero point of instrument 15, which is protected by a diode for current in the opposite direction. The instrument has the following scale on its mechanical indicating range:

% if complete deflection 100  80  60  50  40  20  80
Value on scale 75  83  94  100  107  125  150

Advantageously, the density of soil specimen 1 is made equal to the Proctor density of the material under investigation, and the density of specimen 2 is made equal to 80 percent of specimen 1.

Instead of determining the dry unit weight of soil having a constant water content, the cited apparatus could be used in a similar manner to determine the variations in water content if the dry unit weight was constant. The cited equation would apply in equivalent manner to the water content. Instead of two soil samples of known dry unit weight two samples having a known water content would be used for the first two probes. The analog computer network would be adjusted in the same manner as has been described in connection with the dry unit weight. To this end, the scale on instrument 15 is also advantageously calibrated so as to show the soil water content.

The invention accordingly enables the compaction of a soil to be measured continuously, very conveniently, and with sufficient accuracy, even during building operations. The results are shown directly, with the result that a continuous watch can be kept on the work at the building site. The invention can also be used in a test department to determine the suitability and performance of various types of compaction apparatus.

We claim

1. A method for determining a characteristic (C) of a test sample of soil using first and second examples of a standard soil similar in nature to said test sample, said first and second examples having known characteristics ($C_1$ and $C_2$ respectively) of the same character as characteristic C and comprising the steps of:
   measuring the conduction current flow ($I_1$) through the first example when an alternating current of a given potential is applied thereto;
   measuring the conduction current flow ($I_2$) through the second example when an alternating current of the given potential is applied thereto;
   measuring the conduction current flow (I) through the test sample when an alternating current of the given potential is applied thereto; and
   computing characteristic $C_t$ with reference to the known characteristics $C_{t_1}$ and $C_{t_2}$ by means of an electronic circuitry representing the mathematical relation $$C_2/C_t = 1 - (1 - C_2/C_1)(I - I_2)/(I_1 - I_2)$$

2. A method as set forth in claim 1, wherein said characteristics are the respective dry unit weights.

3. A method as set forth in claim 1, wherein said characteristics are the respective water contents.

4. An apparatus for carrying out the method of claim 1 and comprising:
   probe means having spaced electrodes between which current will flow when they are in a conducting medium and voltage is applied thereacross;
   a source of alternating current;
   current magnitude detection means;
   means forming a series circuit through said probe means, said source and said current magnitude detection means so that when the spaced electrodes are in soil a current will flow through said circuit; and
   analog computer means connected to said magnitude detection means.

5. An apparatus for measuring a particular characteristic of a test sample of soil using first and second examples of a standard soil similar in nature to said test sample, said first and second examples having known characteristics of the same character as characteristic to be measured, said apparatus comprising:
   probe means having spaced electrodes between which current will flow when they are in a conducting medium and voltage is applied thereacross, said electrodes being exposed so that they can be inserted in a test soil sample in physical contact with the soil of the test sample;
   a source of alternating current;
   current magnitude detection means;
   means forming a series circuit through said probe means, said source and said current magnitude detection means so that when the spaced electrodes are in soil a current will flow through said circuit; and
   analog computer means connected to said magnitude detection means for determining said particular characteristic from the magnitude of the current flow through the probe means in the test sample in relation to the magnitude of the current flow through the probe means in the examples.

6. An apparatus as set forth in claim 5,
   including means for deriving a first and a second reference voltage signal continuously variable from zero from said source;
   wherein said detection means produces sample voltage signals indicative of the current flows through the soil sample and examples, the flow through the soil sample being represented by the signal I and the flow through the first and second examples being represented by signals $I_1$ and $I_2$, respectively; and wherein said analog computer means comprises:
   means connected to receive and superpose said sample signals to said reference signals, particularly for superposing current indicative signal $I_2$ to the first of said reference signals, and produce a first voltage signal continuously variable from zero, means connected to receive said sample signals for superposing said first component signal to a second voltage signal represented by the second of said reference signals, and a phase-sensitive rectifying indicating device connected to the last mentioned means for receiving said superposed voltage signals.

7. An apparatus as set forth in claim 6, wherein said analog computer means includes means connected to said source and said device for deriving a signal from said source, reversing its phase and applying it to said device.

8. An apparatus as set forth in claim 5,
wherein said probe means includes three distinct probes each having a spaced pair of electrodes; and
said means forming said series circuit includes a multiposition switch by which each of the distinct probes may alternatively connect in said series circuit.

9. A method for measuring the dry unit weight of a soil in order to determine the degree of consolidation of the soil achieved during constructional work, comprising the steps of
 a. providing two known samples of said soil of different known degree of consolidation and therefore of different known dry unit weight,
 b. obtaining electric conductivity values of said known samples and applying a quantity depending thereon on an analog computer designed as a linear interpolating network, and adjusting said network in accordance with said known dry unit weight and conductivity values to produce outputs with said electric conductivity values applied, indicative of the dry unit weight of said samples,
 c. obtaining an electric conductivity value of a sample of said soil having an unknown dry unit weight and applying a quantity depending thereon to said analog computer, whereby an output as a direct indication of the dry unit weight of said unknown sample is obtained.

* * * * *

UNITED STATES PATENT OFFICE
CERTIFICATE OF CORRECTION

Patent No. 3,769,581   Dated October 30, 1973

Inventor(s) Fritz König and Klaus König

It is certified that error appears in the above-identified patent and that said Letters Patent are hereby corrected as shown below:

Abstract, line 7, "a.c.," should be --a.c.--

Col. 2, line 21, "Another" should be --An--

Col. 3, line 32, "tha" should be --the--

Col. 3, lines 35, 41, "a.c.," should be --a.c.--

Col. 5, line 27, "if" should be --of--

Col. 5, line 28, "80" should be --0--

Col. 8, line 9, after "thereon", change "on" to --to--

Signed and sealed this 23rd day of July 1974.

(SEAL)
Attest:

McCOY M. GIBSON, JR.
Attesting Officer

C. MARSHALL DANN
Commissioner of Patents